United States Patent [19]

Hirose

[11] Patent Number: 4,583,470
[45] Date of Patent: Apr. 22, 1986

[54] ASH DISPOSER FOR SYSTEM TO RECOVER RESOURCES FROM SLUDGE

[75] Inventor: Yasuo Hirose, Yokohama, Japan

[73] Assignee: Nippon Furnace Kogyo Co., Ltd., Tokyo, Japan

[21] Appl. No.: 689,210

[22] Filed: Jan. 7, 1985

Related U.S. Application Data

[63] Continuation-in-part of Ser. No. 415,963, Sep. 8, 1982, Pat. No. 4,507,127.

[30] Foreign Application Priority Data

| Dec. 21, 1981 | [JP] | Japan | 56-205251 |
| Dec. 21, 1981 | [JP] | Japan | 56-205252 |
| Dec. 21, 1981 | [JP] | Japan | 56-205253 |
| Mar. 23, 1982 | [JP] | Japan | 57-44553 |
| Mar. 23, 1982 | [JP] | Japan | 57-44554 |
| May 25, 1982 | [JP] | Japan | 57-87296 |

[51] Int. Cl.[4] .......................... F23G 5/00; F23G 7/00
[52] U.S. Cl. ................................ 110/346; 110/171; 110/214; 110/224; 110/244; 110/259; 110/264; 110/266
[58] Field of Search ............... 110/238, 346, 224, 244, 110/171, 259, 264, 265, 266, 210, 214, 347

[56] References Cited

U.S. PATENT DOCUMENTS

| 3,889,608 | 6/1975 | Pitt | 110/244 X |
| 3,958,518 | 5/1976 | Yoshida | 110/238 |
| 4,050,387 | 9/1977 | Luchsinger et al. | 110/238 X |
| 4,060,042 | 11/1977 | Baraldi . | |
| 4,213,407 | 7/1980 | Headley | 110/238 X |
| 4,245,570 | 1/1981 | Williams . | |
| 4,311,103 | 1/1982 | Hirose . | |
| 4,361,100 | 11/1982 | Hinger | 110/238 |
| 4,388,875 | 6/1983 | Hirose . | |
| 4,398,476 | 8/1983 | Suzuki et al. . | |
| 4,429,643 | 2/1984 | Mulholland | 110/238 |

Primary Examiner—Edward G. Favors
Attorney, Agent, or Firm—Beveridge, DeGrandi & Weilacher

[57] ABSTRACT

A system for recovering resources from sludge in which sludge containing water in the amount of 90 to 70 percent is first supplied to a sludge concentrator through a forced supply equipment where the sludge is concentrated to contain a water content of a maximum of about 60 percent; then is sent to a drying furnace having a fluidized sand bed. The product obtained in the drying furnace is separated to gas and solid. After the separated gas is pressurized by a fan and is heated by a heat exchanger through a circulator passage, a portion thereof is supplied to the drying furnace as gas for drying and the remainder is sent to the sludge concentrator. The water content is then removed from the concentrated gas and the gas obtained from the sludge concentrator is used in the system as gaseous fuel. Further, the separated solid is dried and distilled through a special gasifying apparatus to recover gaseous fuel, and in addition, the separated solid is fed into ash disposal equipment; the ash generated from the gasifying apparatus is also supplied to the ash disposal equipment to allow the ash to be melted and then to allow the ash to be solidified in the ash disposal equipment and to take out the solidified massive ashes; the exhaust gases from the gasifying apparatus and ash disposal equipment are supplied to the said heat exchanger.

8 Claims, 20 Drawing Figures

Fig. 20

ASH DISPOSER FOR SYSTEM TO RECOVER RESOURCES FROM SLUDGE

REFERENCE TO A RELATED APPLICATION

This is a continuation-in-part of my copending U.S. application Ser. No. 415,963 filed Sept. 8, 1982 now U.S. Pat. No. 4,507,127, the entire disclosure of which is relied on and incorporated herein by reference.

BACKGROUND OF THE INVENTION

Figure 1:
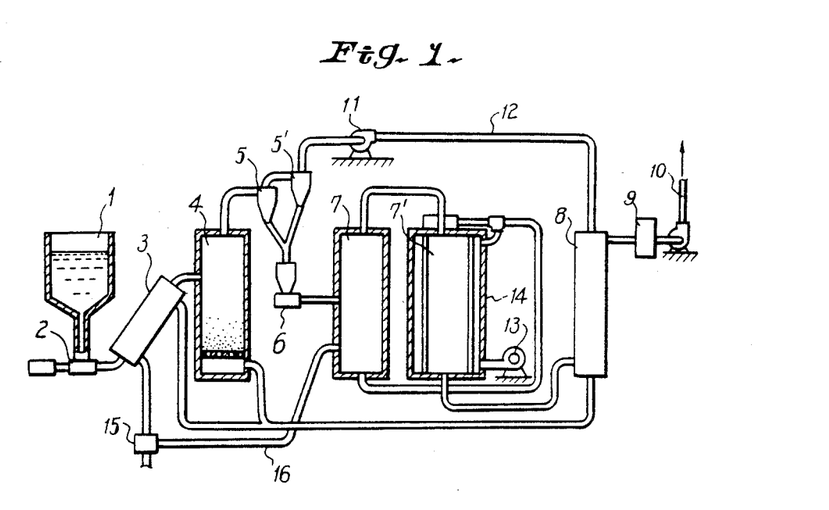
FIG. 1 is a flow diagram of the sludge incineration system which was previously developed by applicant.

Conventionally, it has been considered that organic sludge requires utilization of auxiliary fuel to burn it. Applicant has conducted many studies on sludge incineration for many years and has invented a technology enabling sludge incineration utilizing less auxiliary fuel by a combustion method employing self-heating energy effectively, even of considerably low calorific sludge and/or even of sludge with high water rate as described in Japanese (application No. Sho-55-169165). FIG. 1 shows this incineration system.

Prior to the explanation of the present invention, the sludge incineration system in FIG. 1 is first described below.

Sludge having a water content reduced to 90 to 70 percent of the original water content by a mechanical dehydrogation method is contained in hopper 1. Forced supply means 2 such as a screw conveyor is provided at the bottom of the said hopper 1 to supply the sludge forcibly into heater 3. The sludge is heated by the said heater, the sludge is fluidized and then fed into drying furnace 4 having a fluidized sand bed. The dried products obtained in the said drying furnace 4 are drawn by suction of blower 11 and are led into separation means 5, and are separated to solidified sludge and dry gas is extracted from the sludge. The separated solid is fed into combustion furnaces by a constant quantity supply means such as screw conveyor 6. The combustion furnaces shown in FIG. 1 comprises a two stage sludge combustion system consisting of incomplete combustion furnace 7 and complete combustion furnace 7'; such an arrangement can largely reduce the $NO_2$ generation rate.

The combustion air for these furnaces is, after being heated in air heater 14 arranged at the periphery of the complete combustion furnace 7', supplied to incomplete combustion furnace 7 and complete combustion furnace 7' as required. The gas produced from complete combustion furnace 7' is drawn by exhaust fan 10, is passed through heat exchanger 8 and filter 9 and is exhausted.

The gas separated by the said separation means 5 is pressurized by blower 11 up to 1000 through 3000 mm water column, and is elevated to a temperature as high as 200° to 400° C., and is sent through circulation passage 12. A required part of the gas is fed into drying furnace 4 having the said fluidized bed for drying, and the remainder is supplied to the said heater 3 for heating.

The gas heated in the same heater 3 is led into drain separation means 15 and, after the drain is removed from the system, is then led through gaseous fuel supply pipeline 16 into combustion furnace 7, for example, as gaseous fuel.

As such, when the heating gas mainly involving steam is heated through the sludge incineration system as shown in FIG. 1, after the drain is expelled out of the system by drain separation means 15, the heated gas is fed into combustion furnace 7. Therefore, the sludge can be burnt smoothly with a relatively small fuel replenishment rate and without harmful gas discharges.

Figure 2:
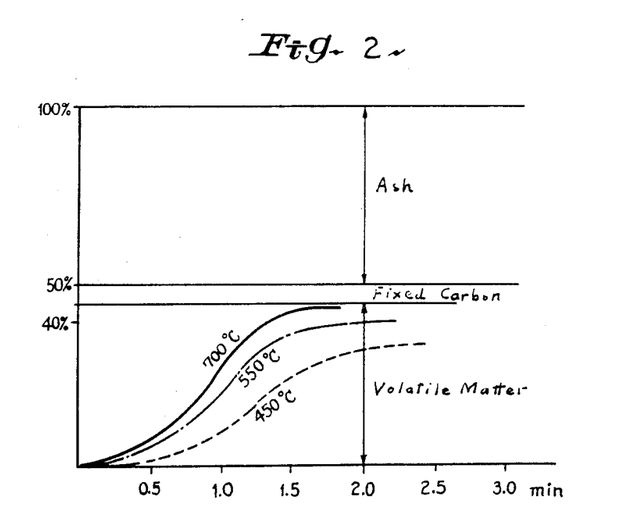
FIG. 2 is a graph showing the compositions of the dried sewage sludge solid and the volatilization speed of the volatile matter at the respective temperatures.

Sewage sludge is taken up as an example. The sewage sludge solid obtained when the sewage sludge is dried by a drying furnace and is separated through a separation means has heating energy from 2000 to 5000 kcal/kg and the contents thereof are ash, in the amount of about 50 percent, and of the remaining portion, about 45 percent is volatile matter and about 5 percent is fixed carbon. The volatile matter can be made into a gaseous fuel by allowing almost all of its quantity to vaporize at an atmospheric temperature from 700° to 450° C. The required time is shorter if the temperature is higher, as shown in FIG. 2.

Moreover, applicant can reduce the sludge quantity to be disposed of by drying furnace 4 and combustion furnace 7, by means of a concentration apparatus which heats sludge and at the same time allows the evaporation of water contained in the sludge and the expulsion of the evaporated steam out of the system at the position of heater 3, instead of merely using heater 3 to simply heat sludge. Therefore, the sludge can be incinerated smoothly, even though drying furnace 4 and combustion furnace are both compacted.

Figure 3:
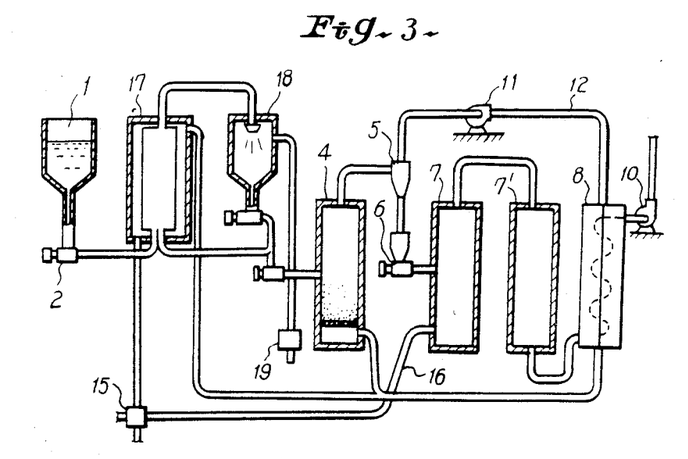
FIGS. 3 and 4 depict the sludge concentration equipment which was previously developed and patented by applicant.
Figure 4:
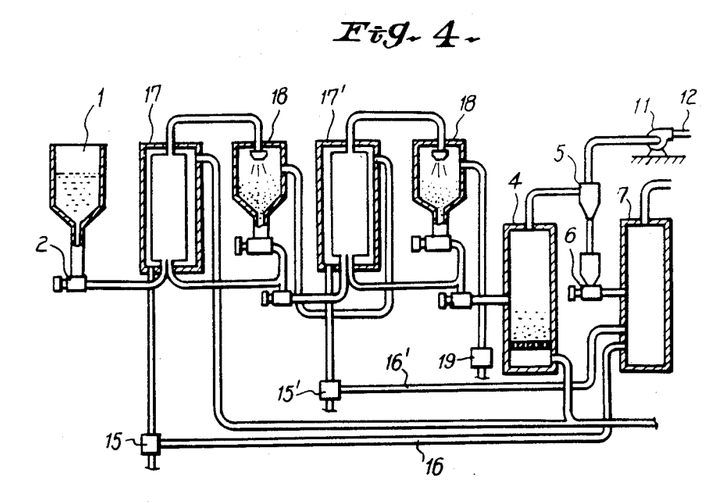

The concentration apparatus shown in FIGS. 3 and 4 is the subject of applicant's Japanese application No. Sho 56-44743 corresponding to U.S. Pat. No. 4,388,875.

In FIG. 3, the sludge transferred by forced supply means 2 installed at the bottom of sludge containing hopper 1 is first fed into heating chamber 17 to which gas for heating is being supplied. The sludge is pressurized and heated in the said heating chamber 17 and is then injected into evaporation chamber 18 under a low pressure. The gas evaporated in the said evaporation chamber 18 is drawn through the suction pipeline having condenser 19, and the water included in the gas is removed from the system by condenser 19. A part of the sludge taken from the bottom of evaporation chamber 18 is supplied to drying furnace 4 having a fluidized sand bed but almost all of the sludge is recycled to heating chamber 17 and is treated during the circulation.

The heating gas fed into heating chamber 17, after being used for heating, is taken out of heating chamber 17, lowered in temperature a little and supplied as gaseous fuel, to combustion furnace 7 through supply pipe 16, after the drain is removed from the system by drain separation means 15.

In FIG. 4, the two sets of heating chambers 17 and evaporation chamber 18 are arranged in series, and by providing two or more such sets, sludge concentration can be carried out more effectively and can supply sludge with lower water content to drying furnace 4 having a fluidized sand bed in the next process step.

INTRODUCTION TO THE INVENTION

This invention relates to a system for recovering resources from sludge. More particularly, the invention described herein relates to a method and apparatus for separation of products obtained from the drying furnace of sludge by separation means 5; for carbonization of the dried sludge products obtained by this separation, for division of these products further to ash and fuel gas, and for recovering both ash and fuel gas.

The sludge incineration system shown in FIG. 1, incinerates sludge sufficiently with the self-calorific value thereof only if the heat energy is clevery utilized, and auxiliary fuel may need to be added only for starting the incineration. However, if the heat energy is more effectively utilized, soil improvers for agriculture can be obtained, gaseous fuel can be recovered or massive ash can be obtained which is suitable for concrete aggregate. It has been determined that such resources are effectively recoverable in the initial process of sludge concentration by allowing the water content of sludge to be reduced by utilizing excess heat of the treatment.

BRIEF DESCRIPTION OF THE DRAWINGS

FIGS. 13 and 14 show, respectively, the conditions under which sludge is drawn from the hopper and sludge is forced toward the supply pipe.

DETAILED DESCRIPTION OF THE INVENTION

Figure 5:
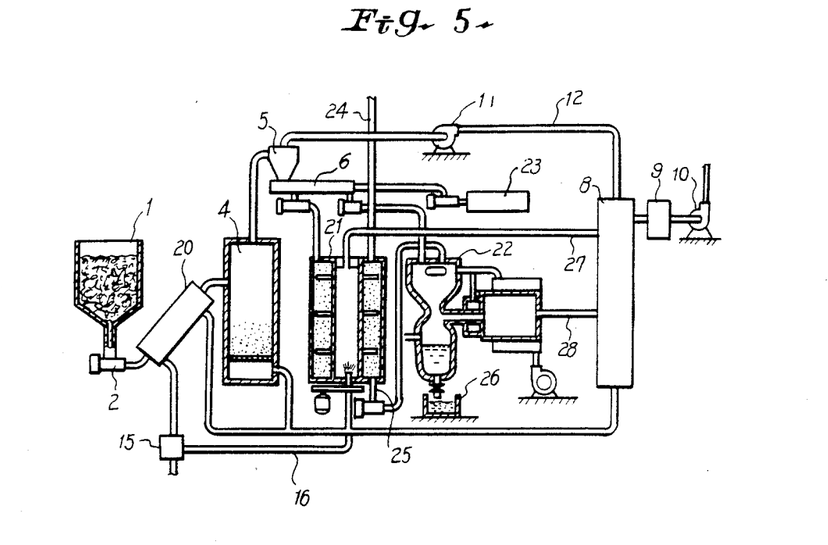
FIG. 5 is a schematic flow diagram to illustrate the system for recovering resources from sludge relating to this invention.

In FIG. 5, forced supply means 2 is installed at the bottom of sludge containing hopper 1 so that the sludge is fed into concentration apparatus 20 where the sludge is heated, dehydrated, and concentrated, and is then supplied to drying furnace 4 which has a fluidized sand bed. The dried products obtained in the said drying furnace 4 are drawn by blower 11 to separation means such as cyclone 5 and are there separated to the solidified sludge and the dried gas extracted from the sludge. The separated solid is supplied for suitable use by a constant solid supply means such as screw conveyor 6. The supply may be to gasifying equipment 21, ash disposer 22, and symbol 23 which represents the application of the said solid to be used, as is, as a soil improver for agricultural purposes.

The gasifying equipment 21 has a construction so that the solid supplied to a distillation or a carbonization chamber around the combustion chamber is distilled or carbonized by the heat of combustion from the combustion chamber located at the center of the apparatus, and the gas for promoting the distillation or the carbonization enters from the bottom of the apparatus, and gaseous fuel is recovered from pipe 24.

The ash taken out of the bottom of the said distillation chamber is fed into ash disposer 22 by ash supplier means 25.

The ash disposer 22 has a cyclone combustion chamber included therein which receives the solid and the ash obtained from the said gasification chamber 21. The massive ash solidifying method of ash with water is made possible by a water tank at the bottom of disposer 22.

The exhaust gas from gasification equipment and the exhaust gas from the second stage combustion chamber are led to heat exchanger 8 through exhaust gas pipeline 28 and are discharged by exhaust fan 10 through filter 9, after they are cooled. The gas obtained from the said separation means mainly containing steam, is pressurized by blower 11, and is carried through circulation passage 12 and is then elevated in temperature through heat exchanger 8. A part thereof, namely, a quantity required for drying sludge to be supplied to drying furnace 4 is fed by recycle into the said drying furnace, and the remaining gas is sent to concentration apparatus 20 as dehydration gas. The gas heated and dehydrated by the said concentration apparatus and the gas volatilized from the sludge by the said concentration apparatus are sent through gaseous fuel supply pipeline 16 and are recovered as gaseous fuel after the drain is expelled out of the system. This gaseous fuel is fed to the gas burner of gasification equipment 21, for example.

Figure 6:
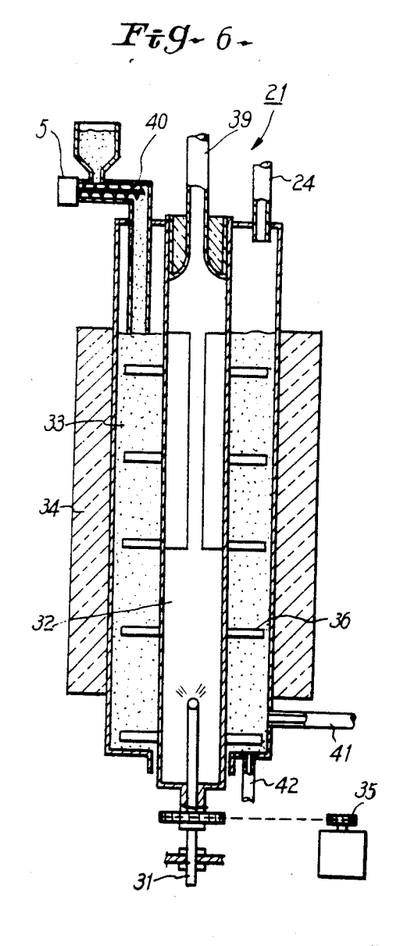
FIGS. 6 and 7 are, respectively, vertical and horizontal sectional views showing one embodiment of the gasification apparatus used in this invention.
Figure 7:
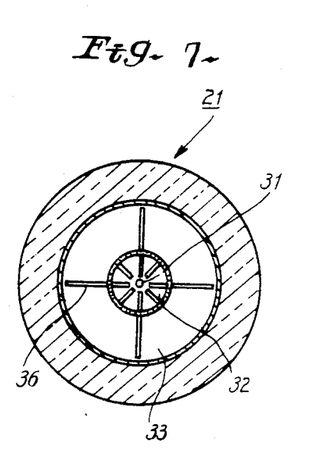

The fuel gas extractor is described in greater detail in FIGS. 6 and 7 which depict an embodiment thereof and is the subject of my application Ser. No. 689,107 filed 1-7-85 concurrently herewith entitled "Fuel Gas Extractor From Dried Sludge For System To Reccover Resources From Sludge".

The solid obtained from separation by separation means 5 has generally been dried to include 5 percent or less of water and powder about 0.2 mm in diameter. The powder is agitated in the said distillation chamber having an atmospheric temperature of from 500° to 700° C. while the gas for promoting volatilization is supplied. Almost all of the volatile matter in the powder is volatilized within 90 seconds, and this volatilized gas is recovered through gaseous fuel exit pipe 24; about one-half of the powder remains as ash. The ash left after the volatilization is removed by way of ash exit pipe 42 and is carried to ash disposal device 22 by screw conveyor 25.

FIG. 2 shows the graph to indicate the contents and the carbonization characteristics of the dried sludge supplied to the system. As shown in FIG. 2, approximately 50 percent of the dried sludge is ash and the ash taken out as the result of the carbonization is alkaline salt mainly consisting of $SiO_2$ and $Al_2O_3$ containing considerable amounts of Na and K as salts. These salts are taken out of ash discharge port 42 of this apparatus at an approximately constant rate.

The greater portion of the remaining part, i.e. about 45 percent is volatile matter and approximately 5 percent is fixed carbon. As may be seen, FIG. 2 indicates that this volatile matter can almost be carbonized by allowing it to be held up for about 1.5 minutes at a temperature from 700° to 500° C. in carbonization chamber 33, however the carbonization is not so smooth at a temperature less than 500° C.

In the device for extracting fuel gas from dried sludge according to the invention, the dried sludge is supplied so that the dried sludge is always positioned to cover the upper portion of carbonization chamber 33, namely, the upper end positions of the heat transfer fins 37; ash is taken out and the dried sludge is held up for approximately 10 minutes in carbonization chamber 33.

In the carbonization chamber 33, the lower portion is higher in temperature than the upper portion. By providing heat transfer fins 37 in the combustion chamber 32, the combustion chamber with gas burner 31 is heated up to 1200° C. and can keep the dried sludge accumulated portion at a temperature from 500° through 700° C. Further, in carbonization chamber 33, superheated steam for promoting volatilization is supplied, and dried sludge is agitated by the agitation vanes; therefore, the dried sludge can be decomposed to volatile matter and ash.

The ash taken out of ash discharge port 42 provided for carbonization chamber 33 may be changed to concrete aggregate separately by a dried sludge ash disposer. A disposer for dried sludge solid according to the invention is described in FIG. 8.

Figure 8:
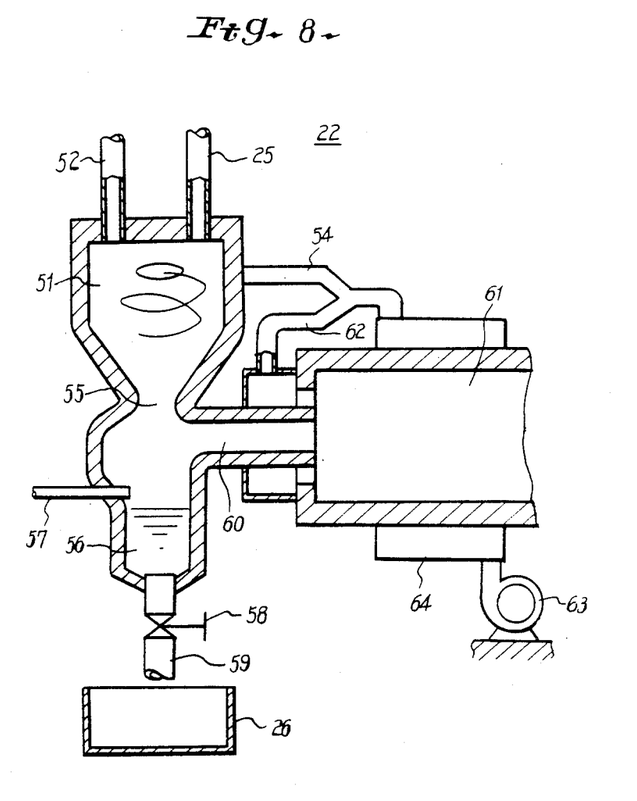
FIG. 8 is a vertical cross-sectional view showing one embodiment of ash disposer 22 of this invention.

In FIG. 8, cyclone combustion chamber 51 in which the first of two stages of combustion is performed, is provided with a cylindrical inner peripheral wall, and preheated primary air is supplied tangentially along the said inner peripheral wall through a primary air supply pipe 54. Two stage combustion is adopted for the disposer of this invention. Namely, cyclone type combustion chamber 51 is the first stage combustion chamber, which is provided with dried sludge solid feed pipe 52 and, if required, feed pipe 25 to supply ash obtained from gas extractor 21. The feed pipe 52 for introducing dried sludge solid and the ash discharge end of ash discharge means 25 received from the said gasification apparatus are mounted on the top of the cyclone combustion chamber. Further, air supply pipe 54 is tangentially fitted to the inner peripheral wall of cyclone type combustion chamber 51. From air supply pipe 54, preheated combustion air is supplied along the side peripheral wall of cyclone combustion chamber 51, and the air rate is controlled to approximately 0.8 of the theoretical air rate required to burn dried sludge solid supplied for the first stage combustion. The flame generated in cyclone combustion chamber 51 is a hollow one and can be formed so as to create a high temperature flame of over 1200° C.

Somewhat throttled portion 55 is provided on the bottom of cyclone type combustion chamber. Water tank 56 having a cross-sectional area a little larger than that of the said throttled portion 55 is installed just below the said throttled portion 55, and water feed pipe 57 is suitably fitted to water tank 56. At the bottom of water tank 56, valve 58 and pipe 59 are located for taking out pebble ash.

A flame way 60 is mounted on the side wall below throttled section 55, and a second-stage combustion chamber 61 is installed at the opposite end of flame way 60. The primary combustion flame generated by cyclone combustion chamber 51 is led, through flue 60 arranged between cyclone combustion chamber 51 and water tank 56, to second stage combustion chamber 61 located in front of the said flue 60. To the said second stage combustion chamber 61, secondary air feed pipe 62 is fitted, through which preheated air is supplied, and rate thereof is approximately 0.3 of the theoretical combustion air rate; thus dried sludge is completely burned in second stage combustion chamber 61. Combustion air fan 63 and a heat exchanger are connected to the chamber 61.

The combustion air is sent to air preheater 64 by blower 63, and the preheated air is divided into primary and secondary air; the secondary air, about 30% of the said theoretical air rate is supplied to the said second-stage combustion chamber through feed pipe 62. Combustion exhaust gas is discharged through pipe 28 fitted to the second-stage combustion chamber 61 as shown in FIG. 5, and then through heat exchanger 8, filter 9, and exhaust fan 10.

A disposer of dried sludge ash for the system to recover resources from sludge according to this invention has such a construction as described above and alkaline ash can be allowed to melt with a reduced atmosphere in the cyclone type combustion chamber of this disposer. That is, air is supplied tangentially along the peripheral side wall of cyclone combustion chamber 51 at a high speed; dried sludge solid and ash supplied by this air flow are also turned along the inside of the peripheral side wall together with this air flow and a hollow flame is formed.

The ash of sludge is alkaline salt(s) containing relatively high sodium and/or potassium, and has a relatively low melting point from 700° to 800° C. It is easily melted on the said inner peripheral side wall since the hollow flame has a high temperature over 1200° C., and flows downward along the same wall, drops down in throttled portion 55 while growing to a certain size of droplet, drops into water tank 56 and is immediately solidified to pebbles. These pebbles can then be taken out of pipe 59 as suitably sized pebbles.

Because these pebbles are alkaline salt with considerably high hardness, they can be used as aggregate for making concrete.

Applicant has developed concentration equipment which is far simpler than that shown in FIGS. 3 and 4 and which can easily increase the concentrated degree of sludge by connecting several sets in series before the system for recovering resources from sludge. If sludge is heated and dehydrated by concentration equipment 20 to reduce water contained in the sludge, the volume is greatly decreased as the water is removed in the later several processes; therefore, such disposers can be compacted very much and all the processes can smoothly be carried out, and in addition, resources can effectively be recovered.

Figure 9:
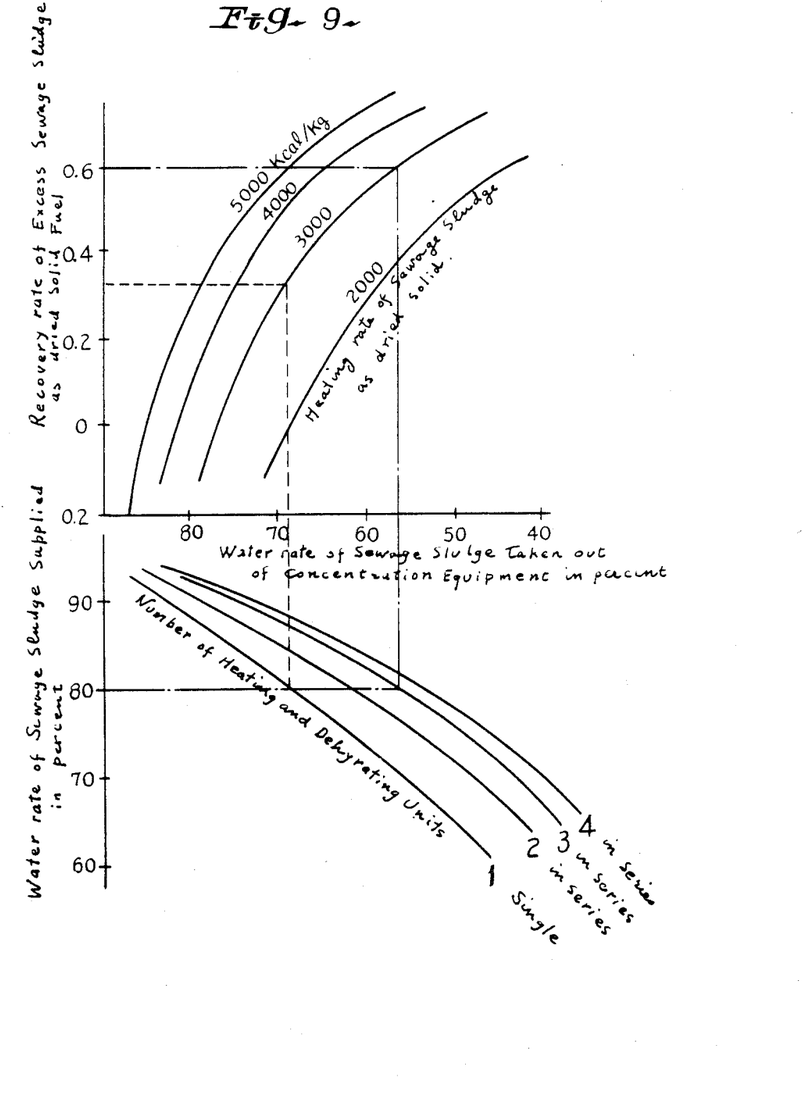
FIG. 9 is a graph showing the dehydration effect of the concentration equipment used in this invention.
Figure 10:
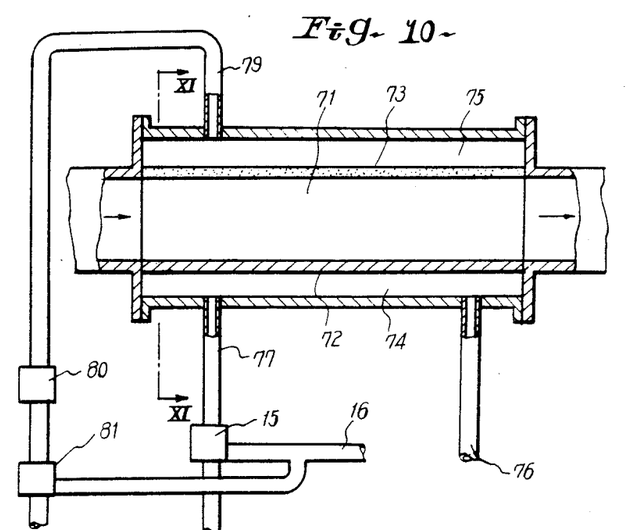
FIGS. 10 and 11 are respectively the side and IX—IX cross-sectional drawings of the concentration equipment with one heating and dehydrating unit used in the system for recovering resources from sludge relating to this invention.
Figure 11:
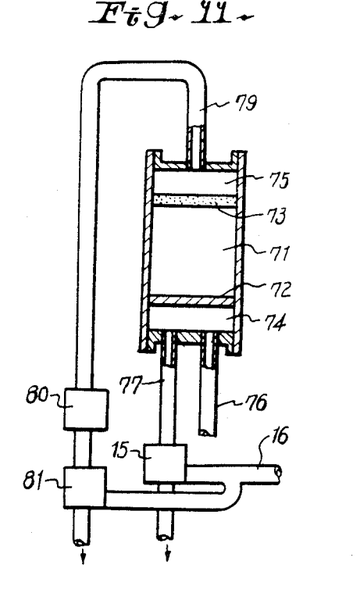
Figure 12:
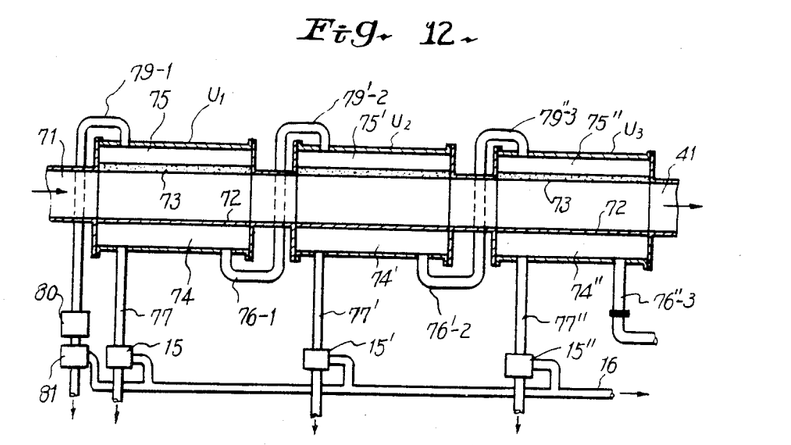
FIG. 12 is a side cross-sectional drawing of the concentration equipment having three heating and dehydrating units used in the system for recovering resources from sludge relating to this invention.
Figure 13:
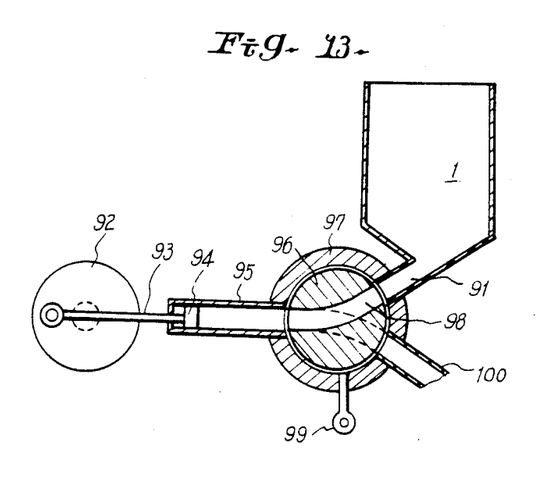
FIGS. 13 and 14 are, respectively, the side cross-sectional drawings which show the supply means to force sludge into supply pipe 100 intermittently under a strong pressure at the side of the concentration equipment used in combination with forced supply means 2 in the system for recovering resources from sludge relating to this invention.
Figure 14:
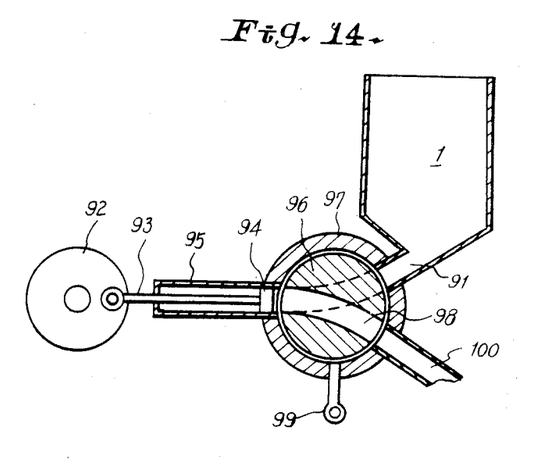
Figure 15:
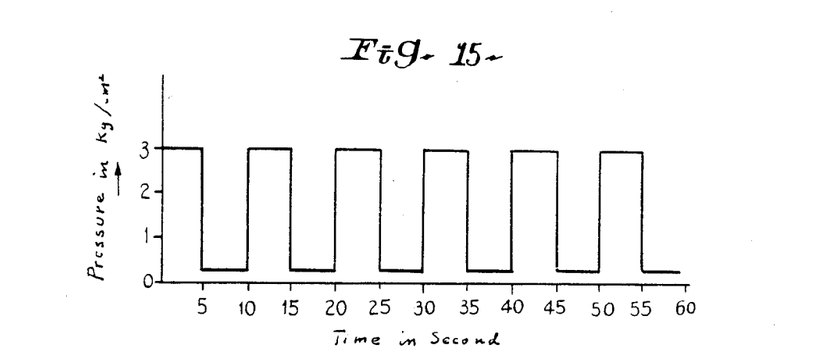
FIGS. 15 and 16 are the graphs showing the time lapse of the change in pressures in supply pipe 100 at the positions before and after the heating and dehydrating devices connected with respective supply pipes 100 of the concentration equipment as combined with the supply means to force the sludge toward the said supply pipes 100 intermittently under a strong pressure as an example.
Figure 16:
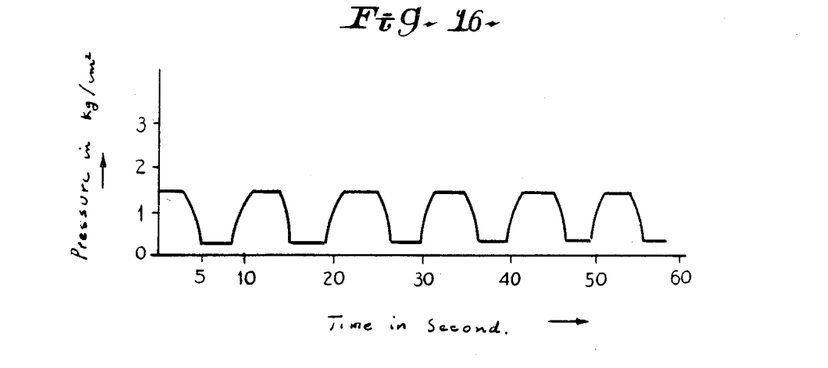
Figure 17:
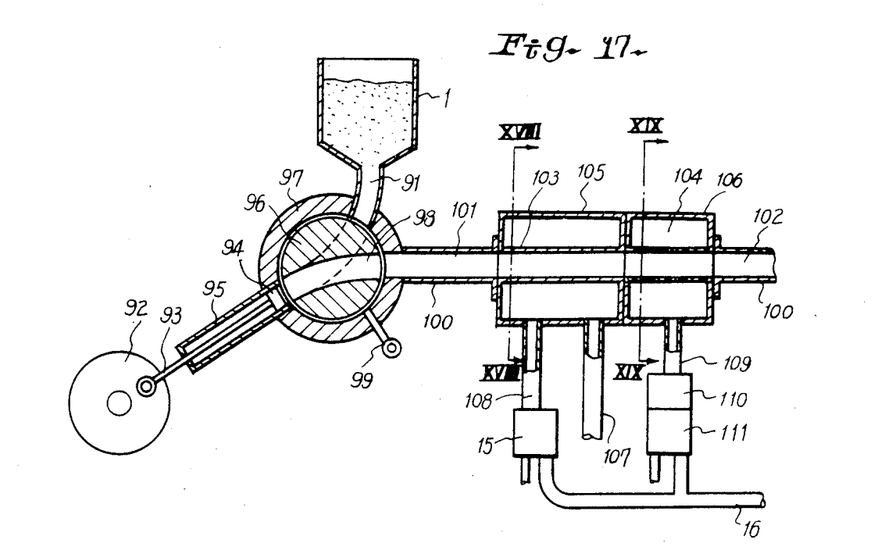
FIG. 17 is a side cross-sectional view of the supply means to force sludge out into supply pipes 100 intermittently under a strong pressure and the concentration or dehydration means.
Figure 18:
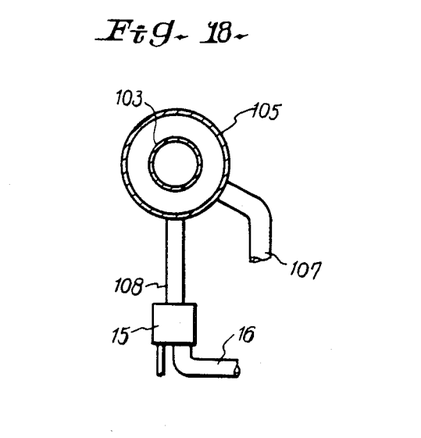
FIGS. 18 and 19 are, respectively, the cross-sectional views at XVIII—XVIII and XIX—XIX in FIG. 17.
Figure 19:
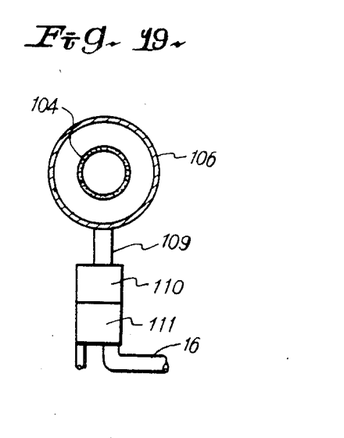
Figure 20:
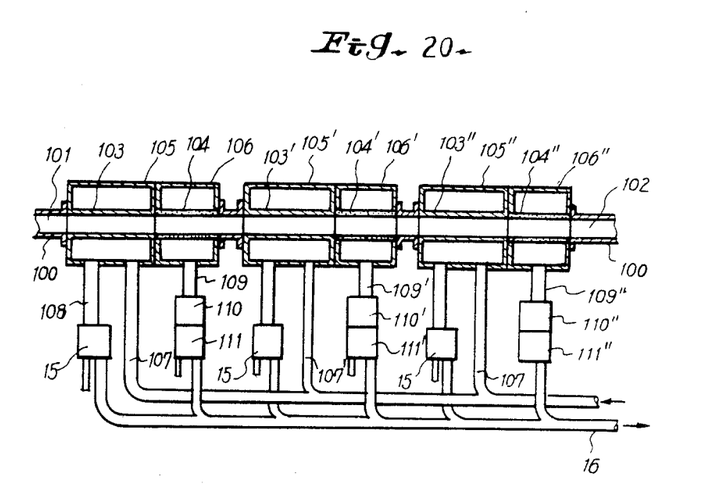
FIG. 20 shows the concentration apparatus provided with the three heating and dehydrating units in series illustrated in FIGS. 17, 18 and 19 as an example. This concentration equipment has also the dehydrating and the heat energy recovering effects explained according to FIG. 9.

In FIG. 9, the lower ordinate gives the water rate in percent of sewage sludge supplied to the system, the abscissa is water rate in percent of sewage sludge taken out of the concentration equipment. The four curves above show, respectively, that the concentration degrees differ, from the number of the heating and dehydrating units of the concentration equipment. In the upper graph the ordinate is the percentage of the dried sewage sludge solid that may be obtained by recovering resources from sewage sludge as a heat source. The four curves show respectively that the heat source percentage recovered differs from the calorific values in dried sewage sludge solid, and each of them gives the calorific value, 2000, 3000, 4000 or 5000 kcal/kg.

For example, if the water rate of sewage sludge supplied is 80 percent and the number of the heating and dehydrating units of the concentration equipment is one, the water rate of sewage sludge taken out of the concentration equipment is 68 percent, and about 30 percent of the solids can be recovered as a heat source, if the calorific value of dried sewage sludge solid is 3000 kcal/kg. If the water rate of sewage sludge taken out of the concentration equipment is 80 percent and the calorific value of dried sewage sludge is 3000 kcal/kg when the number of the heating and dehydrating units of the concentration equipment is three, the water rate of sewage sludge taken out of the said concentration equipment is 60 percent and heat recovery, about 60 percent can be obtained by this system for recovering resources from sludge.

That is, when the three heating and dehydrating units are installed and sewage sludge in as much as 100 tons containing 80% water is treated every day, the composition of sewage sludge supplied is 20 tons solid per day and 80 tons water per day. The 80 tons/day of water is reduced to 30 tons/day by the concentration equipment having the three heating and dehydrating units, while the 20 tons/day of solid is unchanged. As a result, the sewage sludge, after being taken out of the said concentration equipment, consists of 20 tons solid per day and 30 tons water per day, for a total of 50 tons/day. This is about one-half as compared with the content as supplied and the solid, 60 percent or 12 tons/day or 3.6 million kcal/day can be recovered as a heat resource. In addition, the installation capacity in the equipment performing the several processes after the concentration equipment may greatly be reduced.

The concentrator and feeder described herein is the subject of my application Ser. No. 689,105 concurrently filed 1-7-85 herewith entitled "Concentrator And Feeder Of Sludge For System To Recover Resources From Sludge".

Further modifications and variations will be apparent to those skilled in the art from the foregoing description and will be encompassed by the claims appended hereto.

I claim:

1. Ash disposer for recovering resources from sludge comprising:
   a cyclone combustion chamber having a cylindrical inner circumferential wall,
   a solid sludge feeder connected to said cyclone combustion chamber, a primary air feed pipe supplying air tangentially along said inner circumferential wall,
   a throttled section below said combustion chamber and a water tank just below said throttled section,
   a flame tube connected to the side of said apparatus between said combustion chamber and said water tank, and
   a second stage combustion chamber downstream of said flame tube.

2. Ash dispenser for recovering resources from sludge comprising:
   a cyclone combustion chamber having a cylindrical inner circumferential wall,
   a solid sludge feeder connected to said cyclone combustion chamber, a primary air feed pipe supplying air tangentially along said inner circumferential wall,
   a throttled section below said combustion chamber and a water tank just below said throttle section,
   a flame tube connected to the side of said apparatus between said combustion chamber and said water tank, and a second stage combustion chamber downstream of said flame tube, and
   ash supply means connected to said cyclone combustion chamber.

3. The ash disposer apparatus of claim 1 further comprising secondary air feed means connected to said second stage combustion chamber.

4. The ash disposer apparatus of claim 1 further comprising said flame tube being connected midway between said combustion chamber and said water tank.

5. A method for recovering the ash of sludge comprising:
   feeding dried sludge to a combustion zone,
   subjecting said dried sludge to cyclonic action in the presence of hot combustion gases,
   melting at least a portion of said sludge,
   permitting the melted sludge to flow in a downward direction,
   plunging the melted sludge with quenching means,
   solidifying said sludge into a finely divided form.

6. The method according to claim 5 further comprising subjecting the dried sludge to the action of a flame in the combustion zone at a temperature of at least 1200° C.

7. The method according to claim 5 further comprising subjecting the melted sludge to a quench in water.

8. The method according to claim 5 further comprising solidifying said sludge into pebble sized particles.

* * * * *